May 10, 1966     N. LAWYER     3,251,033

MOTOR VEHICLE EMERGENCY SWITCH AND SIGNAL

Filed Dec. 30, 1963     3 Sheets-Sheet 1

May 10, 1966     N. LAWYER     3,251,033

MOTOR VEHICLE EMERGENCY SWITCH AND SIGNAL

Filed Dec. 30, 1963     3 Sheets-Sheet 2

May 10, 1966  N. LAWYER  3,251,033
MOTOR VEHICLE EMERGENCY SWITCH AND SIGNAL
Filed Dec. 30, 1963  3 Sheets-Sheet 3
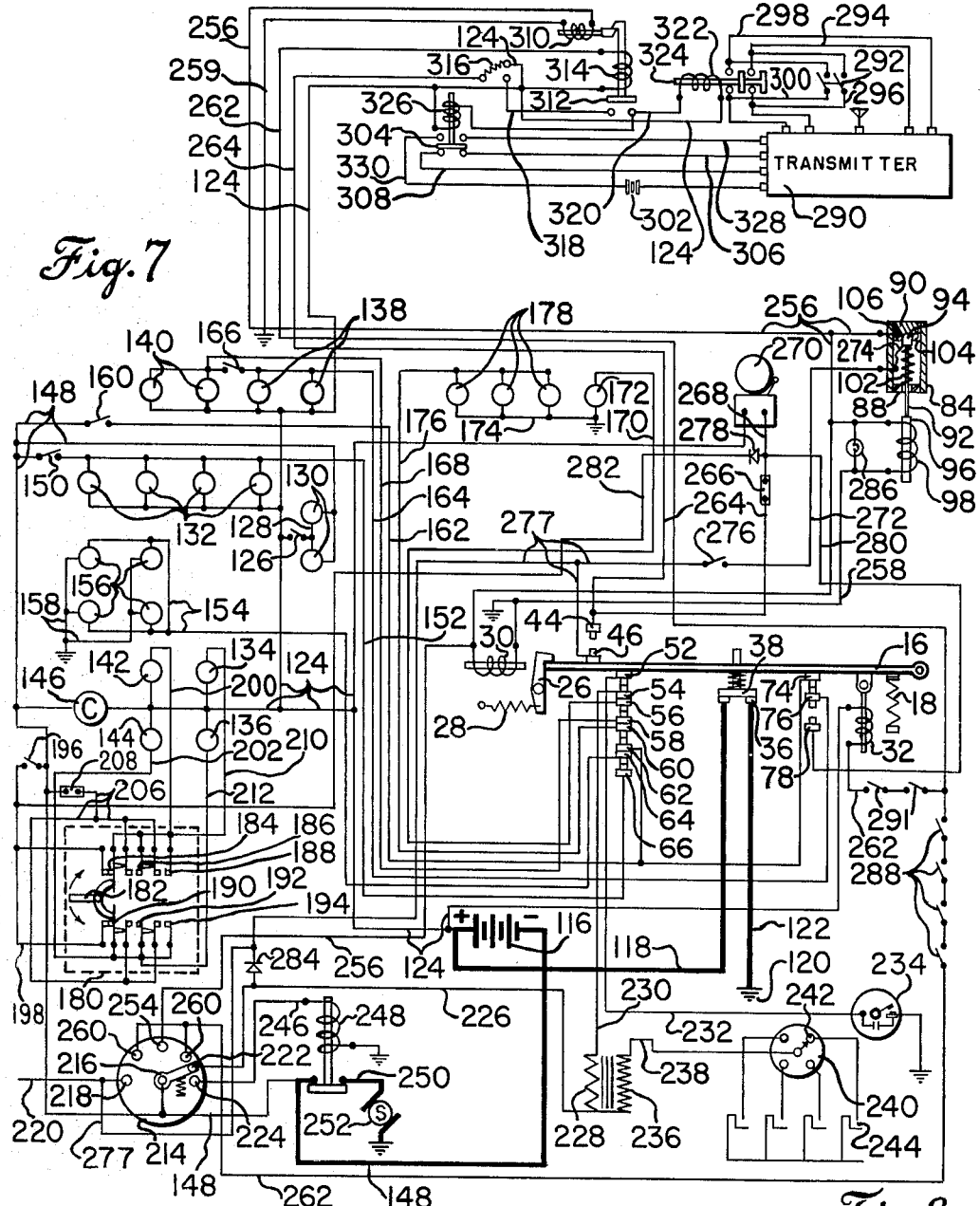
Fig. 7
Fig. 8
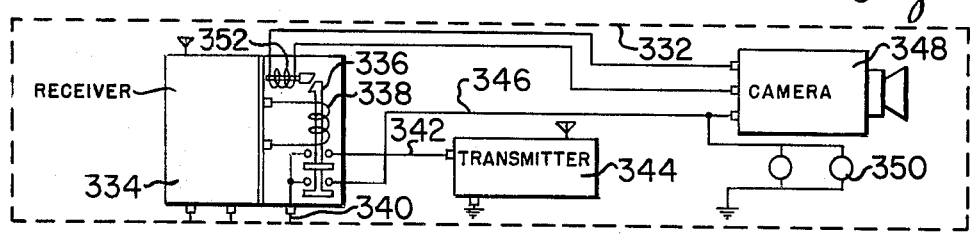

United States Patent Office 3,251,033
Patented May 10, 1966

3,251,033
MOTOR VEHICLE EMERGENCY SWITCH
AND SIGNAL
Noah Lawyer, 45 Lehigh Ave., Rochester, N.Y.
Filed Dec. 30, 1963, Ser. No. 334,201
19 Claims. (Cl. 340—61)

The invention described herein relates to the electrical systems used in motor vehicles, and more particularly to the opening of the major electrical circuits of a motor vehicle as a safety feature when the vehicle is not in use or in the event of a collision.

This application is a continuation-in-part of application Serial No. 220,382, filed August 30, 1962.

Automotive fires are often the result of short-circuits in the electrical systems of motor vehicles. With presently existing automotive electrical systems, short-circuits can result following a collision, or on other occasions, even though a vehicle's ignition switch has been turned to its "off" position. The invention herein minimizes the possibility of such fires by isolating the vehicle's battery from the vehicle's major electrical circuits whenever the ignition switch is placed in the "off" position, or in the event of collision.

An object of the invention is the provision of a generally improved and more satisfactory safety circuit for automotive vehicles.

Another object is the provision of means for isolating a vehicle's battery from its major electrical circuits whenever the vehicle is not in use.

Still another object is the provision of a generally improved and more satisfactory impact operated collision switch for motor vehicles.

A further object is the provision of a system for isolating a vehicle's battery from its major electrical systems in the event of a collision.

A still further object of the invention is to provide a safety switch and circuit for motor vehicles which requires only a minimum amount of power for its operation.

Another object of the invention is to provide a simple circuit safety switch system which can be incorporated into existing automotive electrical circuits.

Still another object is to provide means for opening a motor vehicle's spark-production circuit immediately in the event of a collision.

A further object is the provision of means for minimizing the possibility of undesirable drainage on automotive batteries when vehicles are not in use.

A still further object of the invention is to provide means for visually indicating a potentially dangerous short circuit in a motor vehicle's electrical system.

Another object of the invention is to provide control switches, signals and circuits connected with the electrical system of a motor vehicle for giving audible and visual signals in the event of a collision and control the electrical system to substantially reduce the likelihood of short circuits.

Another object of the invention is to provide a radio transmitter on a motor vehicle with collision operated electrical controls included in the electrical system of the motor vehicle for transmitting an emergency signal in case of collision for operating a radio receiver monitored by traffic control centers for giving notice of the collision.

Another object of the invention is to provide traffic intersections with a camera automatically operated by a signal from a radio transmitter on a motor vehicle for photographing a collision in the event a motor vehicle equipped with collision operated electrical controls for the radio transmitter has a collision at the intersection causing operation of the controls and the radio transmitter.

These and other desirable objects may be attained in the manner disclosed as an illustrative embodiment of the invention in the following description and in the accompanying drawings forming a part hereof, in which:

FIG. 1 is a vertical longitudinal cross section through a housing containing the emergency control switch and impact operated switch constructed according to the present invention with portions broken away and other portions shown in elevation to illustrate details of construction showing how the safety control features provided by the present invention may be mounted in a suitable casing in a suitable location on an automobile and connected into the electrical circuits of the motor vehicle.

FIG. 7 is a wiring diagram showing portions of the electrical system of a motor vehicle and the electrical connections of the emergency control switch and impact operated switch and associated electrically operated components for securing operation thereof in accordance with the invention.

FIG. 8 is a wiring diagram of a receiver, transmitter and photographing unit operated by the emergency transmitter on a motor vehicle.

Figure 1:
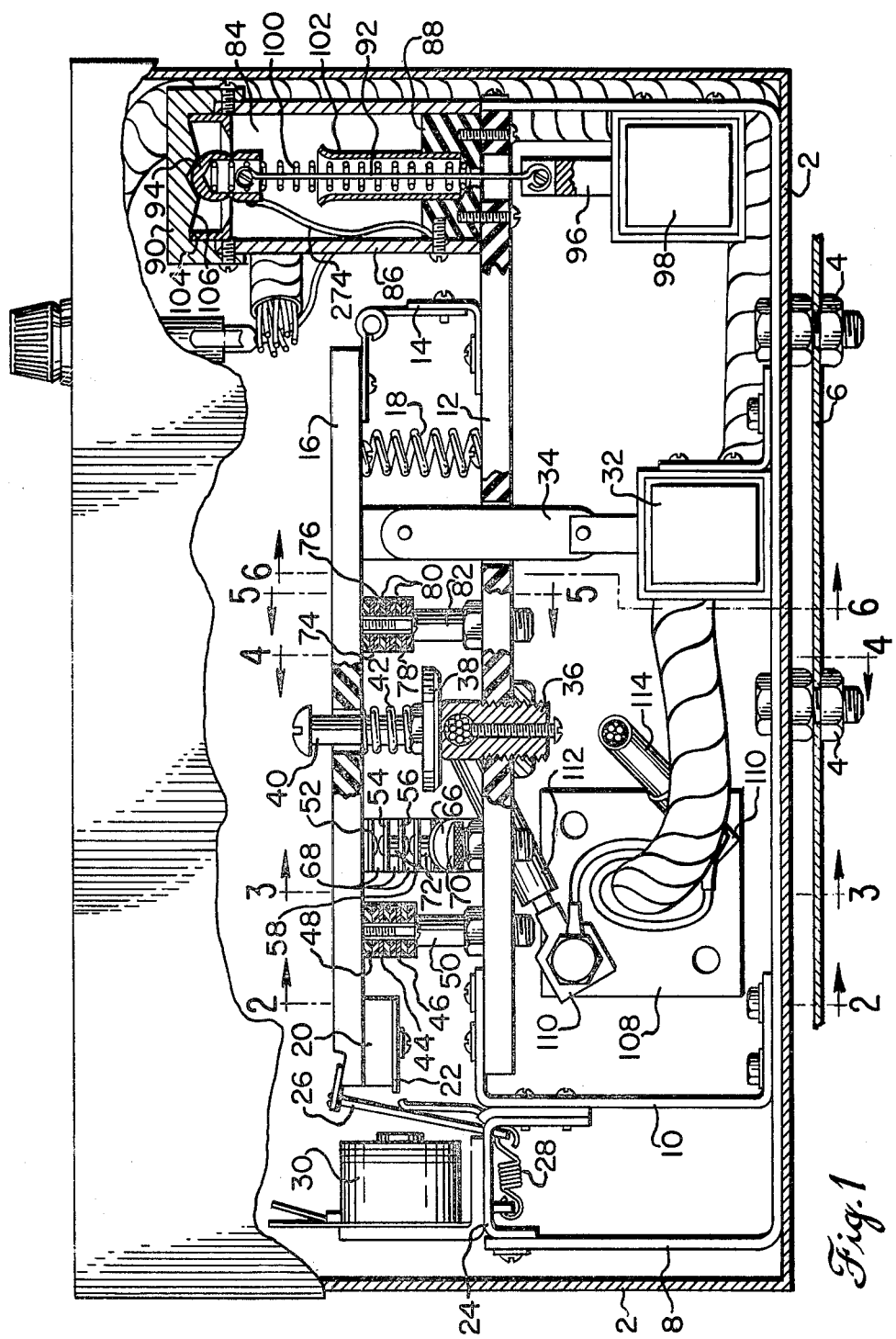

The apparatus provided by the present invention may be assembled in a suitable housing 2 as illustrated in FIG. 1, which may be detachably mounted by means of suitable bolts and nuts indicated at 4 on the dash plate 6 of a motor vehicle located at the rear of the engine compartment. A suitable supporting frame 8 of U-shape has a bottom portion secured to the bottom of housing 2 by means of the bolt and nut connection 4. A base plate supporting bracket 10 is mounted on the bottom portion of supporting frame 8 and spaced inwardly a slight distance from one end thereof as shown in FIG. 1. The base plate 12 is formed of suitable insulating material of rectangular shape with opposite ends secured to one end of the supporting frame 8 and the base plate supporting bracket 10 in spaced parallel relation to the bottom portion of the supporting frame 8, as shown in FIG. 1.

A supporting bracket 14 is formed with an angularly extending foot portion secured to the upper face of the base plate 12 by suitable screws or the like, and has a hinge member on the opposite end adjustably mounted thereon so that the position of the hinge relative to the base plate 12 may be adjusted to move it closer or farther away from the base plate. The hinge portion of supporting bracket 14 has one terminal portion of the movable plate 16 secured thereto for hinging movement toward and from the base plate 12 about the hinge portion of the supporting bracket 14, as clearly shown in FIG. 1. A pair of compression springs 18 are mounted to extend between opposite portions of the movable plate 16 and the base plate 12, are arranged in a plane extending transversely to the longitudinal dimension of the plates 12 and 16 and have the opposite ends secured by screws or the like to the plates 16 and 12 respectively. These compression springs 18 normally operate to move the movable plate 16 away from the base plate 12 to disengage the several contacts in a manner that will be hereinafter described. The free end of the movable plate 16 carries a block 20 mounted on the side facing the base plate 12 and has the stop bar 22 mounted on the other side thereof with one end of the bar projecting outwardly beyond the end of the movable plate 16, as shown in FIG. 1.

A connecting strip 24 is secured to the base plate supporting bracket 10 at the outer end thereof and to the outer adjacent end of the supporting frame 8, as shown in FIG. 1, to provide a support in substantially coplanar relation with the base plate 12 beyond one end thereof. The support provided by the connecting strip 24 carries a pivoted latch 26 having an angularly extending end portion for engaging over the outer surface of the free terminal portion of the movable plate 16, as shown in FIG. 1. The opposite end of latch 26 is pivotally secured to the connecting strip 24 with a portion projecting on the opposite side of the connecting strip 24 for mounting the tension spring 28 at one end. The opposite end of the spring 28 is connected to a portion of the connecting strip 24 for normally moving the latch 26 to have the end thereof engaged over and hold the movable plate 16 in closed position. When the latch is moved to disengage the end of the movable plate 16, the compression springs 18 will move the free end of the plate outwardly on the hinge mounting on the bracket 14 until the end of the pivoted latch 26 engages the projecting portion of the stop bar 22 for limiting the movement of the movable plate in open position.

A latch solenoid 30 carried by a suitable bracket is mounted on the connecting strip 24 as shown in FIG. 1, adjacent to the pivoted latch 26 for magnetically moving the latch 26 on its pivot against the tension of the spring 28 for disengaging the movable plate 16 so that it may move into its open position from the closed position shown in FIG. 1. A plate solenoid 32 is carried by a bracket mounted on the bottom portion of the supporting frame 8 below the base plate 12 near the central portion thereof and has an armature provided with a link connection 34 extending through an aperture in the base plate 12 with the upper end of the link connection 34 pivotally attached to the movable plate 16. When the plate solenoid 32 is energized it will operate the armature and the link connection 34 to move the movable plate 16 from the open or unlatched second position into the closed or latched first position until the pivoted latch 26 engages over the outer end for retaining the movable plate in the closed position, as shown in FIG. 1.

Figure 4:
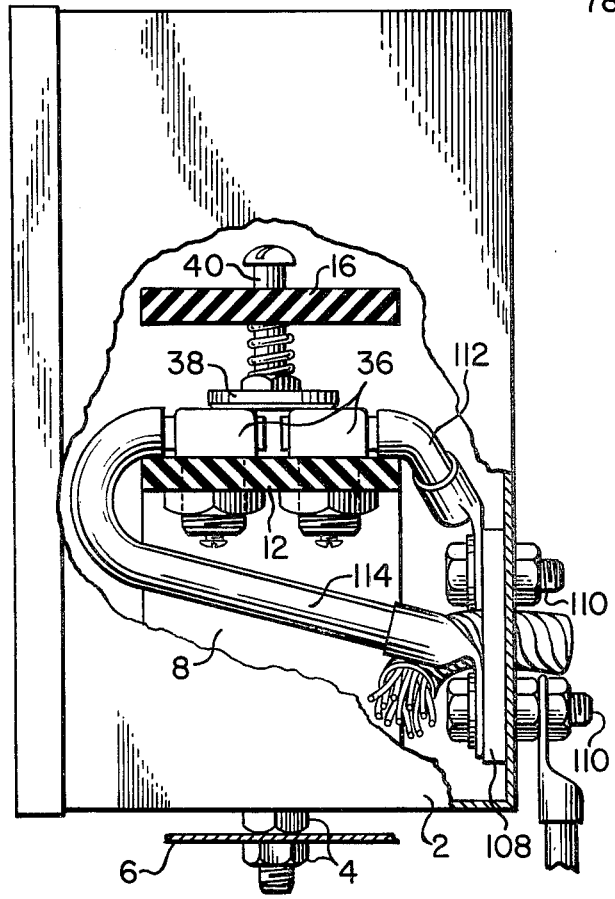
FIG. 4 is a vertical transverse cross section taken approximately on the line 4—4 of FIG. 1 illustrating details of construction of the contact blocks and plate for use in connecting one terminal of the battery to the motor vehicle ground.
Figure 6:
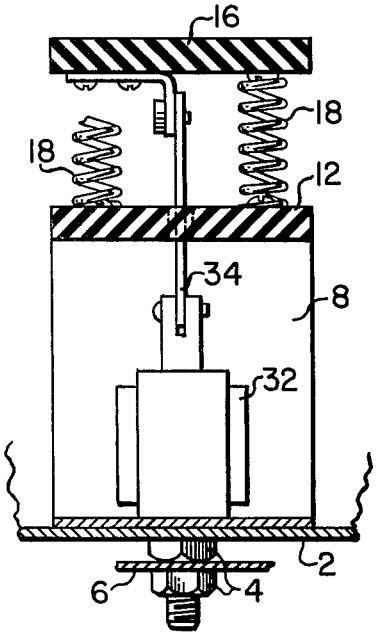
FIG. 6 is a vertical transverse cross section taken approximately on the line 6—6 of FIG. 1 illustrating the solenoid and link construction for moving the movable plate into a closed position and the springs normally operating to move the movable plate into open position.

The central portion of the base plate 12 carries a pair of contact blocks 36 mounted on the upper face thereof as shown in FIGS. 1 and 4, in transversely alined relation and slightly spaced from one another. The contact blocks 36 have threaded bolts projecting through apertures in the base plate 12 for receiving suitable nuts on the under side of the base plate for firmly securing the contact blocks to the base plate so they will project outwardly from the base plate 12 toward the movable plate 16. The contact plate 38 is mounted on the end of a screw 40 slidably engaged in an aperture in the movable plate 16 in alined relation to the contact blocks 36 so that the plate 38 may be moved to engage the outer surfaces of both contact blocks. The screw 40 has a head on the outer side of the movable plate 16 for limiting the movement of the contact plate 38 away from the plate 16. A compression spring 42 is mounted about the screw 40 between the movable plate 16 and the contact plate 38 for moving the contact plate away from the movable plate 16 until the head on the screw engages the movable plate. The contact plate 38 engages the contact blocks 36 with the spring 42 being compressed when the movable plate 16 is moved into closed position so the contact plate will be held under spring pressure in firm engagement with the contact blocks 36 while the movable plate 16 is retained by the latch 26 in closed position. This insures a constant electrical contact and circuit through the contact plate between the contact blocks 36 and the circuit connected thereto for carrying the current required by the engine starter motor.

Figure 2:
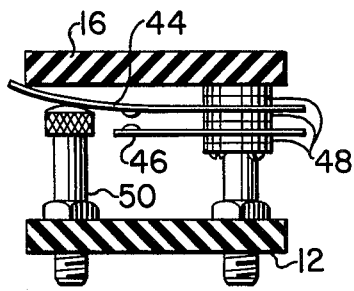
FIG. 2 is a vertical transverse cross section taken approximately on the line 2—2 of FIG. 1 showing details of construction of one of the pairs of contact members.

The movable plate 16 carries a pair of contacts 44 and 46 arranged in substantially parallel relation and has corresponding ends mounted between insulting blocks indicated at 48 rigidly secured to the movable plate 16 on the free end portion adjacent to the block 20 and stop bar 22, as shown in FIGS. 1 and 2 with the contacts 44 and 46 extending in transverse spaced substantially parallel relation to the movable plate. The contact 44 is longer than the contact 46 and the pair of contacts carry contact points on the free end portions which are normally engaged to close the circuit controlled thereby. A contact operating post 50 is adjustably mounted on one side portion of the base plate 12 and projects toward the movable plate 16 in alined relation with the outer end portion of the contact strip 44 so that the free end of the post 50 will engage the contact strip 44 and flex it away from the contact strip 46 to disengage the contacts carried thereby and open the circuit through the pair of contacts when the movable plate is latched in the closed position. When the movable plate is released so that it moves into the open position, the contact strips 44 and 46 will operate to engage the contacts and close the circuit controlled thereby in a manner that will be hereinafter described.

Figure 3:
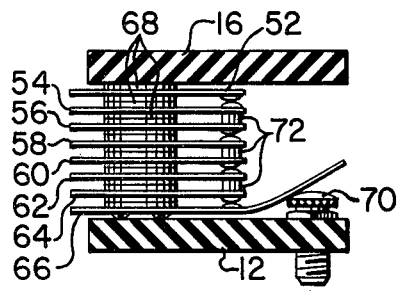
FIG. 3 is a vertical transverse cross section taken approximately on the line 3—3 of FIG. 1 illustrating the details of construction of four pairs of contact members.

Four pairs of contact strips, see FIGS. 1 and 3, are mounted in superimposed spaced relation with insulating washers separating the several strips from one another with the assembled group of contact strips mounted on the under side of movable plate 16 in a position between the contact strips 44 and 46 and the screw 40 carrying contact plate 38. The contact strips 52 and 54 form one pair mounted adjacent the under face of the movable plate 16, the contact strips 56 and 58 form a second pair, the contacts 60 and 62 form a third pair and the contact strips 64 and 66 form the fourth pair. Insulating washers 68 have one washer engaged between each contact strip and the adjacent contact strip of each pair and between the contact strips of the pairs to mount all of the contact strips in superimposed and insulated relation relative to each other on movable plate 16. Suitable attaching screws extend through apertures in the insulating washers and contact strips for securing the four pairs of contact strips in superimposed relation on the bottom face of movable plate 16 at one side thereof, as shown in FIG. 3. The contact strip 66 on the bottom pair of contact strips has one end portion extending beyond the free ends of the other contact strips as shown in FIG. 3, for engagement with the head on the contact operating post 70 adjustably mounted in the base plate 12. The four pairs of contact strips have the inner ends extending toward the opposite side of the movable plate 16 where the terminal portions of each pair of strips carry contact points in opposed relation to each other for engagement in closing a circuit controlled by the pair of contacts. A plurality of operating blocks 72 of insulating material have one operating block mounted between each pair of contacts in alined relation with the contact points on each pair of contacts with the operating block secured to one of the contacts of a pair and adapted to transmit force to operate the adjacent contact of the adjacent pair. The free end of the contact strip 66 extending over the head on the contact operating post 70 is adapted to engage the head on the post when the movable plate 16 is moved into the closed position, as shown in FIG. 1, for moving the contacts of the pair of contact strips 64 and 66 into engagement with each other to close the circuit controlled thereby. This operation of the contact strip 66 by the post 70 will operate the contacts of the other three pairs mounted above the lower pair of contacts 64 and 66 through the operating blocks 72 to engage the contact points of each pair with one another so that the circuits controlled by the four pairs of contacts will be closed when the movable plate 16 is latched in closed position. These contacts of the four pairs are normally operated to have the contact points of each pair of contacts disengage from one another to open the circuits controlled thereby when the movable plate 16 moves to the open position. The circuits controlled by these four pairs of contacts will be described in connection with the wiring diagram, as shown in FIG. 7.

Figure 5:
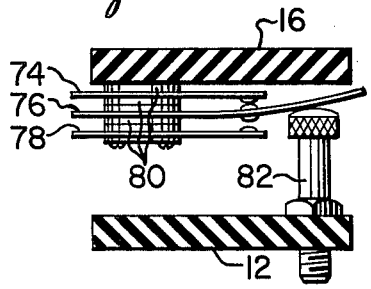
FIG. 5 is a vertical transverse cross section taken approximately on the line 5—5 of FIG. 1 illustrating details of construction of a group of contact members.

Another set of contacts is mounted on the movable plate 16 between the contact plate 38, the screw 40 and the link connection 34 for the plate solenoid 32. This set of contacts is illustrated in FIGS. 1 and 5 and has three contact strips 74, 76, and 78 respectively, with corresponding ends engaged with and separated by insulating washers 80. Suitable screws are detachably extended through the assembled spaced parallel contacts, the insulating washers 80 and threaded into the under side of the movable plate 16 at one side thereof, for mounting these contacts on movable plate 16. The contact strips 74, 76, and 78 respectively, each extend in spaced parallel relation toward the opposite side of the movable plate 16 below the under surface thereof. The contact strip 76 is longer than either contact strip 74 or contact strip 78 with the free end extending beyond the ends of these contact strips 74 and 78, shown in FIG. 5. The contact strip 76 has a pair of contact points mounted one on each side of the contact strip in alined relation with the terminal portion of the contact strips 74 and 78 and contact points mounted on the adjacent faces thereof. The contacts are arranged and mounted on the movable plate 16 so that the contact strip 76 will normally have one contact thereon engaging the contact on the contact strip 78 for normally closing the circuit controlled by the contact strips 76 and 78 respectively. The other contact on the contact strip 76 will normally be spaced from the contact point on the contact strip 74 so that the circuit between the contact strips 74 and 76 will normally be open. An operating post 82 is adjustably mounted on the base plate 12 so that the head on the end of the post will engage the free end of the contact strip 76 which extends beyond the ends of the contact strips 74 and 78 respectively, for moving the contact point thereon into engagement with the contact point on the end of the contact strip 74 for closing the circuit between the contact strips 74 and 76 when the movable plate 16 is in the closed position, as shown in FIG. 1. This operation of the contact strip 76 by the post 82 will also operate to disengage the contact on the contact strip 76 from the contact on the end of the contact strip 78 to open the circuit controlled thereby. The operating post 82 is adjustably mounted on the base plate 12 so that the position of the contact strip 76 to obtain this operation between the three contacts 74, 76, and 78 can be secured for the desired circuit operation hereinafter described in connection with FIG. 7 when the movable plate is in the closed position shown in FIG. 1.

The above described construction is for the emergency control switch assembly made according to the present invention. The invention also provides for an impact operated switch in the form of an assembled unit indicated by the numeral 84 mounted on the end portion of base plate 12 adjacent to the supporting bracket 14, as shown in FIG. 1. The impact operated switch 84 has a cylindrical casing 86 with the end members 88 and 90 each mounted on opposite ends thereof. Suitable means such as screws or the like detachably secure the end members to the casing 86. The end member 88 is formed with a central passage for slidably receiving the flexible wire contact support 92. One end of the contact support 92 extends toward the end member 90 and detachably mounts a movable contact member 94, while the opposite end slidably engages in the end member 88 and projects outwardly through an aperture in the base plate 12 for attachment to the armature 96 of the impact switch solenoid 98.

The impact switch solenoid 98 is mounted in a frame rigidly attached to the adjacent leg of the supporting frame 8, as clearly shown in FIG. 1, so that when the solenoid is energized it will pull the armature 96 into the solenoid and slidably move the contact 94 away from the inner surface of the end member 90 for resetting the movable contact member 94. A compression spring 100 has one end mounted in a socket formed in the end member 88, is engaged about the flexible wire contact support 92, has the lower end slidably engaged in the spring guide sleeve 102 mounted in the socket in the end member 88 and has the opposite end engaged with the movable contact member 94 for normally sliding the wire contact support 92 and the contact member 94 toward the end member 90 to engage the outer rounded end of the contact member 94 with the inner surface of the end member 90. A cylindrical or annular stationary contact member 104 is mounted in the end member 90 about the inner cylindrical surface thereof and the inner surface of the adjacent portion of the cylindrical casing 86 in transversely alined relation with the movable contact 94. Whenever the movable contact 94 is forced to move out of its central position in the cylindrical casing toward the sides thereof in any direction it will engage the stationary contact 104 whenever it moves outwardly to a sufficient extent and will close a circuit controlled thereby which will be hereinafter described.

The inner surface of the end member 90 is formed with a ridge or inwardly projecting portion 106 providing a central recess and an annular outer recess in the end member 90 as shown in FIG. 1. When the movable contact member 94 is caused to move by an impact applied to the casing in an outward direction toward the casing 86 the outer surface thereof will move along the inner surface of the end member 90 and slide over the ridge 106 into the annular recess for engagement with the cylindrical contact 104. The compression spring 100 will operate to provide for the movement of the contact member 94 along the inner surface of the end member 90 from the recess inside the ridge portion 106 to the annular recess on the outside of the ridge portion 106 and retain the movable contact member 94 in engagement with the stationary contact member 104 for closing the circuit controlled thereby.

An insulating block 108 is mounted in an aperture formed in one side wall of the housing 2 as shown in FIGS. 1 and 4 and is formed with a central aperture for the passage of electric wires from the inside of the housing to the various electrical equipment on the motor vehicle so the two switches in the housing 2 may be connected in the circuits in a manner that will be described. The contact blocks 36 have heavy cable connections to the bolts 110 mounted on opposite corner portions for transmitting the high current requirements of the starter. Two heavy cable members 112 and 114 respectively, are mounted inside the housing 2 for connecting the contact bolts 110 to the contact blocks 36 as shown in FIGS. 1 and 4. Set screws are threaded in the contact blocks 36 to retain the ends of the cables connected in bores formed in the contact blocks. These bolts 110 provide a means for connecting heavy cables to the ends of the bolts on the inside and the outside of the housing 2 in a convenient manner for connecting the contact blocks 36 in circuit with the motor vehicle electrical system in a manner that will now be described in connection with the wiring diagram shown in FIG. 7.

The motor vehicle battery is shown in the wiring diagram FIG. 7, at 116. The positive terminal of the battery 116 is connected by one of the heavy cables indicated in FIG. 7 by the wire 118 through one of the bolts 110 to one of the contact blocks 36. The other contact block 36 is connected by a heavy cable through the other bolt 110 to the motor vehicle ground indicated at 120 by the heavy cable or wire connection 122. The contact plate 38 engages the contact blocks 36 when the movable plate 16 is in the closed position, to close the circuit from the battery to the motor vehicle ground 120 and thereby provide a closed circuit for the normal operation of the motor vehicle and its electrical equipment.

The positive terminal of the battery 116 has electric conductor 124 connected to one terminal of the courtesy light switch 126. The other terminal of the courtesy light switch 126 has a wire 128 connecting it to the courtesy lights 130. These courtesy lights are the ones usually lighted for illuminating the inside of the vehicle body when the doors are opened. The conductor 124 is also connected to one terminal of the parking and tail lights 132, one terminal of the right front turn signal 134, one terminal of the left front turn signal 136, one terminal of the low beam head lights 138 and one terminal of the high beam head lights 140. The wire or conductor 124 is also connected to one terminal of the right stop light 142, one terminal of the left stop light 144 and one terminal of the clock 146.

The wire 148 connected to the negative terminal of the battery 116 is connected to one terminal of the parking and tail light switch 150. The other terminal of the parking and tail light switch 150 is connected by wire 152 to the opposite terminal of the parking and tail lights 132 and is then extended to and connected to the contact strip 66 having its contact points held engaged with the contact point on the contact strip 64 when the movable plate 16 is latched in closed position, as shown in FIG. 1. The contact strip 64 has a wire or conductor 154 connecting it with one terminal of each of the lights 156 used to illuminate the license plates, the trunk and other similar light connections provided on the usual motor vehicle. The other terminal of each of the lights 156 has a connection indicated by the numeral 158 to ground on the motor vehicle frame. A circuit from the lights 156 to the positive terminal of the battery is completed through the ground 120, the conductor or cable connection 122, the contact blocks 36, the contact plate 38 and the conductor 118 to the positive terminal of the battery 116. The parking and tail lights and the lights 156 have the circuit thereto controlled by the parking and tail light switch 150 located and operated in the usual manner by the motor vehicle driver.

A head light switch 160 has the wire 148 connected to one terminal thereof and the wire 162 connected to the opposite terminal thereof extending to and connected to the contact strip 74 having the contact point thereof engaged with the contact point on the contact strip 76 connected by the wire 164 to the opposite terminal of the head lights 138 and one terminal of the high beam switch 166. The other terminal of the high beam switch is connected by the wire 168 to the opposite terminals of the high beam head lights 140. The wire 168 is also connected to the contact strip 58 mounted on movable plate 16 with the contact point thereon normally held engaged with the contact point on the contact strip 56 when the movable plate 16 is latched in closed position as shown in FIG. 1. The wire 170 connected with the contact strip 56 is connected with one terminal of the high beam indicator light 172 mounted on the instrument panel of the motor vehicle and usually having the other terminal provided with a ground connection 174. The wire 162 is alos connected to the contact strip 62 mounted on the movable plate 16 which has its contact point normally engaged with the contact point on the contact strip 60 when the movable plate is latched in closed position as shown in FIG. 1. The contact strip 60 has a wire connection 176 with one terminal of each of the instrument lights 178. The other terminal of the instrument lights 178 usually has a ground connection to the automobile frame as indicated at 174.

The contact strips 74 and 76 and the contact strips 60 and 62 will operate to control the low beam head lights 138 and the instrument lights 178 so that the movable plate 16 must be in the closed position as shown in FIG. 1 in order to use the low beam head lights and the instrument lights in the normal operation of the motor vehicle equipped with the present invention. The contact strips 56 and 58 control the circuit to the high beam indicator light 172 and cooperate with the contact strips 74 and 76 which also control the circuit to the high beam headlights 140 through the switch 166 so that the movable plate 16 must be latched in the closed position as shown in FIG. 1 in order to have the circuit to the high beam headlights and the high beam indicator light closed for the usual operation of the motor vehicle. The pair of contact strips 56 and 58, the pair of contact strips 60 and 62 and the pair of contact strips 64 and 66 control the circuits to the high beam indicator light 172, the instrument lights 178 and the lights 156 for illuminating the license plate, trunk etc. which all have one terminal of the lights grounded to the frame of the motor vehicle. These pairs of contacts are provided to open the circuits at the emergency control switch through the movable plate 16 moving to open position so the circuits to these several lights are held open in the event of a collision of the motor vehicle equipped with the present invention. This arrangement is provided to eliminate the likelihood of short circuits that might start a fire in the event of a collision.

The wire 148 is connected to the opposite terminal of the clock 146 so that the clock is connected in circuit with the battery 116 for the normal operation of the clock during use of the vehicle.

The turn signal control switch assembly is indicated diagrammatically at 180 by the dotted rectangle in FIG. 7 and includes the manually operated control handle 182 which is movable from an "off" position to a position for operating the circuits to secure operation of the right turn signals and to another position to secure operation of the left turn signals. The conventional turn signal control switch assembly usually contains three pairs of switch contacts operated when the control handle 182 is positioned to operate the right turn signals indicated by the numerals 184, 186 and 188 respectively. Three pairs of switch contacts 190, 192 and 194 respectively, are operated when the control handle is moved to operate the left turn signals. The pairs of contacts 184 and 190 respectively, are normally closed when the control handle 182 is in the "off" position while the remaining pairs of contacts are normally open or disengaged from one another.

The brake operated switch 196 has one terminal connected to the wire 148 and the negative terminal of the battery. The other terminal has a wire 198 connected thereto and also connected with one of the contacts of each of the pair of contacts 184 and 190 respectively. The other contact of the pair of contacts 184 has a wire connection 200 with the other terminal of the right rear stop light 142. The other terminal of the pair of contacts 190 has a wire 202 connecting it to the other terminal of the left rear stop light 144. This is the conventional circuit for securing the normal operation of the stop lights by operation of the brake pedal in the usual operation of the motor vehicle. The wire 200 is also connected to one contact of the pair of contacts 188. The other contact of the pair 188 and one contact of the pair 186 have a wire connection 206 to one terminal of a conventional flasher switch 208 having the other terminal connected to the negative side of the battery 116 by the wire 148. The wire 206 also connects one terminal of the flasher to one contact of the pair 192 and one contact of the pair 194. The wire 202 to the left rear stop light 144 is connected to the other contact of the pair 194. The right front turn signal 134 has a wire 210 connecting the other terminal thereof to the other contact of the pair of contacts 186 in the turn signal switch assembly. The front left turn signal 136 has a wire 212 connecting the other terminal thereof with the other contact of the pair 192. When the control handle 182 of the turn signal control switch assembly is moved to secure operation of the right turn signals, it will open the pair of contacts 184 and close the pairs of contacts 186 and 188. The pair of contacts 186 will close the circuit to the right front turn signal 134 through the wire 210 and the pair of contacts 188 will close the circuit through the wire 200 to the right rear stop light 142 for using it as the right turn signal. These contacts 186 and 188 will also close the circuit through the wire 206 to the flasher 208 which will alternately close and open the circuit to the front right turn signal light 134 and the right rear stop light 142 for giving the right turn signal by alternately flashing these two lights.

When the control handle 182 is moved to secure operation of the left turn signals, it will open the pair of contacts 190 and close the pairs of contacts 192 and 194. The pair of contacts 192 will close the circuit to the front left turn signal 136 through the wire 212 and the pair of contacts 194 will close the circuit through the wire 202 to the left rear stop light 144 for using it as the left turn signal. These contacts 192 and 194 will also close the circuit through the wire 206 to the flasher 208 which will alternately close and open the circuit to the front left turn signal light 136 and the rear stop light 144 for giving the left turn signal by alternately flashing these two lights.

The right front turn signal light 134 has the wire 210 connecting it to one of the pair of contacts 186 also connected to the wire 200 and one of the pair of contacts 184 by modification of the turn signal assembly according to the present invention so the right front turn signal light 134 will be lighted when the brake switch 196 is closed. The left front turn signal light 136 will also be lighted simultaneously when the brake switch 196 is closed by connecting the wire 212 to one contact of the pair of contacts 190. These connections cause both front turn signal lights 134 and 136 to light when the stop lights 142 and 144 are illuminated by closing the brake switch 196 and gives motorists coming toward the vehicle notice that the vehicle operator is modifying the operation of his vehicle by slowing down.

The wire 124 connecting the positive terminal of the battery to the courtesy lights, the headlights, the parking and tail lights and the turn signals in the conventional motor vehicle circuit usually has this circuit wire replaced in the form of a ground connection to the frame and body of the vehicle while according to the present invention the ground circuit to these several lights is eliminated and these several circuits together with the clock circuit are insulated from the motor vehicle frame and body to provide a wire connection for use as a special feature of the present invention in connection with the operation of the impact control switch 84 and the emergency control switch having the movable plate 16.

The usual key operated motor vehicle ignition switch is indicated at 214 in FIG. 7. It has the conventional switch arm 216 rotatable to engage one of a plurality of selected contacts in the usual manner. The ignition switch 214 has the switch arm 216 connected to the conductor 148 and the negative terminal of the battery 116. The ignition switch 214 has the contact 218 engaged by the switch arm 216 when the motor vehicle is not operating in order to close the circuit through the conductor 220 to the accessories, such as a radio, on the motor vehicle which it is desired to electrically operate while the vehicle is parked. The conductor 220 is connected to one terminal of the accessories while the opposite terminal is connected to the conductor 124 to complete a wired circuit to the opposite terminal of the battery insulated from the motor vehicle ground.

The ignition switch 214 has the contact 222 which the switch arm 216 engages to close the usual ignition circuit and the contact 224 closely adjacent to the contact 222 so that the switch arm 216 may engage both contacts in the conventional manner for closing the circuit to the starter solenoid for starting the motor vehicle engine. The ignition contact 222 has the conductor 226 connecting it to one terminal of the primary 228 of the ignition coil. The opposite terminal of the primary 228 is connected by the conductor 230 to the contact 54 normally engaging the contact 52 when the emergency control switch 16 is in the closed position. The contact 52 has a conductor 232 connecting it to the distributor 234 for establishing a circuit to one of the distributor contacts while the other contact is connected to the motor vehicle ground as indicated diagrammatically in FIG. 7, in the usual conventional manner.

The distributor 234 diagrammatically indicates the usual make and break type of distributor now conventionally used on most motor vehicle engines. The conductor 226 is also connected to one terminal of the ignition coil secondary 236 having the opposite terminal connected by the conductor 238 to the central contact on the distributor cap 240. The distributor cap has a plurality of circumferentially arranged contacts 242 constructed in the usual conventional manner, each having electrical connections with the individual spark plugs indicated diagrammatically at 244, four being shown in FIG. 7.

It is well known in the art that the distributor has separate wire connections with each spark plug from one of the circumferential contacts 242, the number of spark plugs and the number of contacts corresponding to the number of cylinders in the usual internal combustion engine used in motor vehicles. While four are illustrated diagrammatically in FIG. 7, it is to be understood that the illustration is merely diagrammatic and that the invention may be used on motor vehicles having any number of cylinders in the motor vehicle engine or for any other type of engine other than the usual internal combustion engine which may be used as a substitute for the conventional engines now in current use.

When it is desired to start the usual motor vehicle engine it is customary on many motor vehicles to use the key operated ignition switch 214 so the contact arm of the switch indicated at 216 may be moved to close the contact to the starter solenoid while maintaining the ignition circuit closed through the ignition contact 222. The present diagrammatic illustration in FIG. 7 shows this type of an electrical system for motor vehicles in which the starter contact 224 has a conductor 246 connecting it to the starter solenoid 248 which has the other contact connected to the motor vehicle ground in the usual manner. When the solenoid 248 is energized it operates a contact bar to close the circuit from the negative terminal of the battery 116 through the conductor 148, the solenoid contacts and the conductor 250 to one terminal of the starter motor 252 having the other terminal connected to the motor vehicle ground in the usual manner.

The description of the wiring diagram in FIG. 7 and these various parts and connections of the electrical equipment used on a motor vehicle are merely for the purpose of illustrating how the invention is electrically connected with the usual conventional motor vehicle electrical system whether it contains exactly the same equipment and circuit connections illustrated or is somewhat differently connected in one of the several conventional ways now in current use. As above pointed out, a special feature of the present invention is the separate return electrical connections 148 for the electrical equipment on the motor vehicle from the normal grounded return circuit.

The conventional wiring circuits to the courtesy lights, clock, parking and taillights, headlights, stop lights, and electrically operated accessories on different models and makes of automobiles and the positions of the several switches controlling the circuits will be slightly different from one another and the arrangement shown in the wiring diagram in FIG. 7. The circuits shown in FIG. 7 illustrate how the present invention is applied to the conventional motor vehicle circuit arrangement and connected in circuit therewith in a manner that illustrates the application of the invention to a typical conventional automotive circuit without showing the variations in different makes and models since it will be clear from the illustration and description how to apply the invention to all conventional circuits.

When the emergency control switch is closed as above described with the movable plate held in the closed position by the latch 26 the battery circuit to the motor vehicle ground is closed through the contact blocks 36 and the contact plate 38 and the ignition circuit from the primary 228 is closed through the closed pair of contacts 52 and 54. In this way the emergency control switch as shown in FIGS. 1–6 and diagrammatically illustrated in FIG. 7 controls the automotive ignition circuit and all of the other circuits which have a grounded return connection.

Remote control means are provided for operating the pivoted latch 26 to release the movable plate 16 of the switch so that it may move to open position and open the circuit to the motor vehicle ground and the ignition circuit of the motor vehicle. This disconnects the grounded circuits of the electrical system of the motor vehicle whenever the movable plate 16 is released by latch 26 and moves to the open position. A remote control is also provided for moving the movable plate 16 into closed position. For this purpose, the usual conventional ignition switch 214 has three additional contacts added to the switch so that the control circuits may be closed in the operation of the key operated switch arm 216. When the motor vehicle ignition switch is in the open position, the movable contact arm 216 will engage the stationary contact 254. This will close the circuit from the negative terminal of the battery 116 through the conductor 148 to the movable switch arm 216 and the stationary "off" contact 254 of the ignition switch to the conductor 256. The conductor 256 has a connection with one terminal of the latch solenoid 30, one terminal of the impact switch solenoid 98 and the cylindrical stationary contact member 104 of the impact switch 84.

The opposite terminals of the latch solenoid 30 and the impact switch solenoid 98 are connected by the conductor 258 to ground to establish a circuit with the cable 122 connected with the motor vehicle ground and one of the contact blocks 36 to establish a circuit through the contact blocks 36, the contact plate 38 and the conductor 118 to the oher terminal of the battery 116. When this circuit is closed by moving the ignition switch arm 216 to the "off" position engaging the "off" position contact 254, the solenoids 30 and 98 will be energized. When solenoid 30 is energized it moves pivoted latch 26 toward the solenoid to disengage the free end from the movable plate 16 which will be moved to the open position by the springs 18. The free end of the latch will engage the stop bar 22 in the open position and limit the movement of the moving plate 16 in the open position by the springs 18. This will disengage the contact plate 38 from the contact blocks 36 and allow the pairs of contact strips 52 and 54, 56 and 58, 60 and 62, and 64 and 66, respectively, to disengage from one another as the movable plate 16 moves away from the free end of the contact operating post 70 so the contacts of each of the four pairs may move to their normal unflexed open positions.

The contact strips 74, 76 and 78 will be operated as the movable plate 16 moves to open position so contact strip 76 will disengage operating post 82 so the circuit through contacts 76 and 74 will be opened by the contacts thereon disengaging one another. The contact strip 76 will move to engage the contact point thereon with the contact point on the contact strip 78 to close he circuit controlled thereby. The circuit to the low beam headlights is opened when the contacts 74 and 76 disengage so they may be connected in a different circuit for use as an emergency signal in case of an accident as hereinafter described.

The impact switch solenoid 98 is energized simultaneously with the latch solenoid 30 and will operate the armature to pull flexible wire 92 and the contact 94 downwardly away from the end member 90 so that whenever the contact 94 has been moved by a sudden impact from the central portion of the end member 90 across the ridge 106 to engage the stationary contact 104 and closing the circuit thereto, the downward movement of the contact 94 will provide for the spring 102 and the flexibility or resiliency of the wire 92 to return the contact 94 into its central position inside of the ridge 106. This will restore the impact switch 84 to its normal inoperative position ready to be operated again whenever the vehicle has a sudden impact with another object which is transmitted to the impact switch 84.

It will therefore be understood that whenever the ignition switch is turned to the "off" position to stop operation of the motor vehicle engine and while the vehicle is parked, the emergency control switch will be moved to the open positon by the movable plate 16 being released by the latch 26. This disconnects the battery from its grounded circuit and opens the circuit to the solenoids 30 and 98. However, with the connections from the several vehicle lights and the clock through the conductor 124, the usual vehicle lights except the instrument panel lights, the high beam indicator light, the license plate lights and trunk light, etc., may be used by closing the respective switches controlling them through the direct wire connections of both terminals of the lights, the clock, etc., with the battery without having a grounded circuit connection.

Two additional contacts 260 are added to the conventional ignition switch on opposite sides of the "off" contact 254. These contacts 260 have a conductor 262 connected to both contacts with the opposite end connected to one terminal of the plate solenoid 32. The opposite terminal of the plate solenoid 32 is connected to the electric conductor 124 for establishing a circuit from the negative side of the battery 116 to the conductor 148, the switch arm 216, one of the contacts 260, the conductor 262, the solenoid 32, and the conductor 124 to the other terminal of the battery. It will be understood that when the ignition switch arm 216 is moved from the open position to close the ignition circuit by engaging the contact 222 or to close the circuit through the contact 218 to the automotive accessories while the motor vehicle is parked, the circuit to the plate solenoid 32 will be closed for energizing this solenoid and moving the movable plate 16 from the open to the closed position. When the movable plate 16 is pulled by the solenoid 32 into the closed position, the spring operated latch 26 will engage over the end of the movable plate 16 and lock it in the closed position. This will re-establish the circuits hereinabove described to the ignition so that the motor vehicle motor may be started, or during use of the accessory equipment that has the opposite terminals connected to the wires 124 and 220, respectively.

As shown in FIGS. 2 and 7, the normally closed pair of contacts 44 and 46 are held in open position by the contact operating post 50 when the movable plate 16 is latched in the closed position.

The contacts 44 and 46 will always be engaged while the movable plate 16 is in the open position. These contacts control the alarm which will not operate in the normal use of the motor vehicle because when the operator stops the vehicle and opens the ignition circuit to stop the motor, the alarm circuit is held open by moving the switch arm 216 to disengage the contact 222. The alarm circuit extends from the negative terminal of the battery 116 through the conductor 148 to the switch arm 216; the contact 222 of the ignition switch 214; the conductor 226; the rectifier 284; the wire 277; the contacts 44 and 46; the conductor 264; the conventional flasher switch 266; the wire 268 to the audible signal or alarm 270 and the other terminal of the battery through the conductor 124.

The alarm circuit will only be closed to sound the alarm in an emergency resulting from the operation of the impact operated switch 84. In case of an accident where the impact operated switch 84 has the movable contact 94 moved to engage the stationary contact member 104, the motor vehicle will be operating with the ignition switch having the switch arm 216 engaged with the contact 222 for closing the ignition circuits. Under these circumstances, the movable contact 94 of the impact operated switch 84 has a conductor 272 connected through a flexible connection 274 inside the casing 84 with the wire 277 and with the contact 222 through rectifier 284 and the wire 226 with the conductor 148 connected with the negative terminal of the battery 116. The circuit from the contact 94 to the stationary contact 104 of the impact operated switch 84 extends through the conductor 256 to one terminal of each of the solenoids 30 and 98 and from the opposite terminals of these solenoids through the conductor 258 to ground, the conductor 122, the contacts 36, the plate 38 and the conductor 118 to the positive terminal of the battery 116. This circuit energizes the solenoid 30 to operate the latch 26 to release the movable plate 16 for movement into open position. The contacts 44 and 46 will engage when the movable plate 16 reaches open position and close the circuit described above to the alarm 270 for starting and continuing its operation. The alarm will be operated intermittently by the conventional flasher switch 266. Any suitable flasher switch may be used, such as the ones used for intermittently operating automobile turn signals. The alarm signal is stopped by operating the ignition switch 214 to move the contact arm 216 to the "off" position out of engagement with the contact 222. During this operation the contact 94 is reset into the central disengaged position relative to the stationary contact 104 by the solenoid 98 being energized as described above.

At the same time that the circuit through contacts 44 and 46 is closed to close the circuit to flasher 266 and alarm 270 as the result of an accident, a circuit is also closed through wire 280, contact strips 76 and 78 and wire 164 to headlights 138 by which the flasher 266 will flash the headlights 138 to give a visible distress signal. This circuit to the headlights 138 is separate from the circuit through switch 160 used to normally control the headlights. This change in circuits enables the headlights to be included in circuit with the flasher 266 in giving a visual distress signal by flashing the headlights.

The wire 277 from impact operated switch 84 is also connected to the wire 220 and the contact 218 for the motor vehicle accessories. Whenever the motor vehicle has the ignition switch arm 216 engaged with the contact 218 and the vehicle is hit by another, the alarm circuits will be closed to sound the alarm 270 and flash the headlights 138 as hereinbefore described.

A manually operated and normally closed switch 276 is included in the conductor 272 to open the circuit between the contact 46 and the movable contact 94 of the impact switch 84 for preventing the operation of the emergency control switch in cases where the motor vehicle is driven over rough surfaces that might cause the impact switch 84 to operate to close the circuit to the alarm 270 when it is not desired.

The invention as above described provides for the remote control of the emergency control switch having the movable plate 16 and the several contacts controlled thereby from remote locations through the electric circuits controlling the latch solenoid 30 and the plate solenoid 32. In the embodiment of the invention above described the latch solenoid 30 is energized for moving the pivoted latch 26 into a position for releasing the movable plate 16 whenever the ignition switch arm 216 is moved to the "off" position and whenever the motor vehicle has a sudden impact of a predetermined intensity sufficient to cause the movable contact 94 of the impact switch 84 to engage the cylindrical or stationary contact member 104 while the ignition switch has the arm 216 engaged with the contact 222 during normal operation of the motor vehicle or the contact 218 while using the accessories. This provides an efficient control of the electric circuits on the motor vehicle from the battery 116 for disconnecting the battery from the grounded connections with the motor vehicle frame of the usual character in the event of an accident through the operation of the impact switch 84 and also for protecting the motor vehicle when it is parked through causing the emergency control switch to move to open position when the ignition switch is turned to the "off" position. Whenever the impact switch is operated in case of an accident it closes the circuit to the alarm 270 in addition to opening the circuit to the grounded connections on the motor vehicle with a view of preventing short circuits to the ground of the motor vehicle through the battery for preventing fires resulting from short circuits occurring and developing as a result of an accident. The wire return circuits for the lights and other accessories on the motor vehicle provide a means for independently using these lights and accessories while the movable plate 16 of the emergency control switch is in open position.

A rectifier 278 has one terminal connected by the wire 280 to the wire 268 and the contact strip 78. The other terminal of the rectifier 278 is connected by the wire 282 to the wire 198. This circuit connection operates with the circuit to the stop lights 142 and 144 to prevent feedback when the brake is applied to stop the vehicle from causing operation of the alarm 270. When the ignition switch arm 216 engages the contact 222 or 218, the circuit connection to the headlights 138 is closed from the wire 226, through the rectifier 284, wire 277, the contacts 44 and 46, the wire 264, flasher switch 266, the wire 280; the contact strips 76 and 78 and the wire 164 to the low beam headlights 138 to cause these low beam headlights to flash simultaneously when the alarm 270 is operated so the headlights give an additional signal to indicate an emergency.

The turn signals and stop lights 134, 136, 142 and 144 are flashed simultaneously when the alarm 270 is operated. The circuit for this operation extends from the negative side of the battery through wire 148, ignition switch arm 216 when it is engaged with either of the contacts 218 or 222, through wire 226, rectifier 284, wire 277, contacts 44 and 46, wire 264, flasher 266, wire 268, rectifier 278, wire 282, wire 198, the pairs of contacts 184 and 190 of turn signal switch 180 to wires 200, 202, 210 and 212, to the lights 134, 136, 142 and 144 and wire 124 to the positive terminal of the battery.

A rectifier 284 has opposite terminals connected to the wires 277 and 226 respectively, for preventing feedback to the distributor points if an accident occurs while the ignition switch has the movable switch arm 216 in position to engage the accessory circuit contact 218 to close the circuit to the accessories through wires 124 and 220 while the motor vehicle is parked and an accident occurs.

It is further contemplated according to the invention to have a signal lamp 286 included in the circuit through the latch solenoid 30 in parallel with the latch solenoid as shown in FIG. 7. This signal light will be energized to show when the circuit to the latch solenoid is closed and will also indicate a grounded circuit in the wiring when the movable plate 16 is in open position.

A further feature of the invention resides in the fact that car thieves are likely to be frightened because if the contact arm 216 is moved over the contact 260 too fast, the circuit to the alarm will be closed because sufficient time is not allowed for the solenoid 32 to move the plate 16 into closed position. As a result the alarm 270 will sound and the headlight 138, turn signals, and stop lights will be flashed on and off by the flasher 266 to give both sound and visual signals. At the same time the circuit to the ignition remains open so the engine of the motor vehicle cannot be started.

The invention provides an additional safety feature by providing a separate set of switches, one for each door, which will prevent starting of the engine until all of the doors are closed. This is illustrated in the wiring diagram FIG. 7. In a motor vehicle having four doors, four switches indicated by the numeral 288 would be used. One switch would be mounted on each door frame similar to the present courtesy light switches. The switches 288 are connected in series in the wire circuit 262 with the solenoid 32. The circuit to the solenoid 32 cannot be closed until all of the doors are closed. This prevents the solenoid 32 from operating movable plate 16 into the closed latched position until the doors are closed. The ignition circuit through contacts 52 and 54 will remain open thereby preventing starting of the motor.

Where seat belts are used, they will be equipped with switch contacts 291 also connected in series in the wire 262. It will then be necessary to have all seat belts equipped with switches 291 secured together before the ignition circuit can be closed. In this way, this invention provides a further safety feature to protect the occupants of the vehicle.

In addition to the visual and audible signal given by the flashing of the headlights on the automobile and the operation of the alarm 270 on the automobile, the invention provides for transmitting an emergency radio signal. For this purpose the motor vehicle is equipped with a conventional form of garage door transmitter indicated diagrammatically at 290 in FIG. 7 and normally used on a motor vehicle for automatically operating a garage door opening mechanism of conventional form. The manual switch 292 is mounted on the motor vehicle for operation to close the circuit for operating the transmitter when the garage door opener is used in opening a garage door. This manually operable switch for automatically opening the garage door through operation of the transmitter 290 is in the form of a double pole single throw switch having four contacts one of which is connected by the wire 294 to one circuit in the transmitter from one terminal of the switch while the opposite terminal of the switch is connected by wire 296 to another circuit in the transmitter. The other two contacts of the switch 292 are connected by the wires 298 and 300 with other circuits in the transmitter 290. These conventional transmitter circuits and switch 292 operate to secure operation of the transmitter to transmit the desired radio signal to the garage door opener for securing operation of the same in the manner well known in the art.

The garage door transmitter 290 will normally have a crystal for controlling the frequency of the radio signal transmitted by the transmitter. This frequency is usually assigned by the Federal Communications Commission. This same transmitter 290 will be used to transmit an emergency radio signal for indicating that the vehicle has been involved in a collision by connecting another frequency control crystal 302 in parallel with the control crystal used in the conventional transmitter 290. For this purpose an electro magnetic control switch 304 has the switch arm normally closing the circuit through the wires 306 and 308 connected in series with the circuit to the control crystal in the transmitter 290 so that the transmitter has the circuit for normal operation thereof in operating a garage door opener closed for operating the garage door. When the vehicle has a collision in which the impact operated switch 84 is operated to close the circuit to the alarm 270 for giving the audible signal, controls are also operated to automatically start the transmitter to send an emergency radio signal.

When the impact operated switch 84 has the movable contact member 94 engage the cylindrical stationary member 104 as a result of a collision, it will close the circuit through the wires 256 and 259 which are connected to opposite terminals of the latch coil 310 of electromagnetic control switch 312 for controlling the circuits for automatically starting the transmitter 290 to transmit a radio distress call. The latch coil 310 of the electromagnetic control latch is connected in parallel with the latch coil 30 and the impact switch solenoid 98 so they are all energized simultaneously. The electromagnetic control switch 312 has the solenoid 314 provided for moving the switch arm to open position when it is energized. One terminal of the solenoid 314 has the wire 262 connected thereto while the opposite terminal is connected to the wire 124 providing a parallel circuit connection with the plate solenoid 32 so they are energized simultaneously.

A time delay relay 316 has the wire 264 connected to the terminal of the contact arm thereof with the normally closed contact of the relay connected by the wire 124 to the positive terminal of the battery 116. The other terminal of the time delay relay 316 is connected by the wire 318 with one contact of the electromagnetic control switch 312. The other contact of the control switch 312 has a wire 320 connecting it to one terminal of the solenoid 322 of the transmitter operating switch 324. The other terminal of the solenoid 322 of the transmitter operating switch 324 has the wire 124 connected thereto for completing a circuit with the battery 116. When the solenoid 322 is energized it will operate the pair of switch contacts to close the two pairs of contacts of the transmitter operating switch 324 connected in parallel with the manual switch 292 by having the wires 294, 296, 298 and 300 connected to the respective contacts of each pair so that when this switch 324 closes it will start the transmitter 290.

The wire 320 is also connected to one terminal of the solenoid 326 of the electromagnetic control switch 304 having the other contact thereof connected to the wire 124 so the solenoid 326 will be energized when the electromagnetic control switch 312 is closed. When the solenoid 326 is energized it will operate the switch arm to disengage the contacts closing the circuit to the wires 306 and 308 and move the arm into contact with a second pair of contacts closing a circuit between the wires 328 and 330 which are connected to terminals of the transmitter 290 to include the control crystal 302 in series in the transmitter circuit of the transmitter 290 in place of the conventional control crystal for broadcasting a radio signal of an assigned frequency to give an emergency signal that the automobile on which the transmitter is mounted has had a collision.

The time delay relay 316 is operated when the circuit to the wire 264 connected therewith is closed for closing the circuit through the relay to the wire 124. This relay is a conventional type of time delay relay which will be operated by the current flowing through the relay from the wire 264 to the wire 124 periodically causing the relay contact to operate to disengage the contact connected with the wire 124 and engage the contact connected with the wire 318 for periodically closing the circuit to the transmitter operating switch 324 and the electromagnetic control switch 304 for periodically operating the transmitter 290 to transmit the desired distress signal.

The distress signal transmitted by the transmitter 290 will operate receivers tuned to receive the distress signal at predetermined locations such as police stations or other traffic control centers. The location of the transmitter 290 can be determined by the conventional means for determining location of a transmitter sending radio signals so that a police car or other emergency vehicle can be sent to the scene of the motor vehicle carrying the transmitter 290 which has had a collision causing its operation.

The invention contemplates the provision of means for locating an emergency control unit at selected or all traffic intersections where accidents frequently occur which will include a motion picture camera for taking a photograph of the accident as it occurs where a motor vehicle equipped with a transmitter 290 is involved in the accident. The transmitter 290 will operate a receiver responsive to the frequency thereof, which will in turn operate controls to start a motion picture camera to take a picture, close the circuit to lights for illuminating the intersection at night to provide the necessary artificial light for the camera to take the picture of the accident, together with a suitable transmitter for notifying police of the location of the accident.

This emergency control unit to be mounted at traffic intersections will include a suitable casing 332 as shown diagrammatically in FIG. 8. A conventional radio receiver 334 is mounted in the casing 332 and tuned to the frequency of the transmitter 290 for receiving the emergency signal transmission controlled by the crystal 302. Suitable power supply connections from a source of power will be connected to the radio receiver 334 for maintaining its continuous operation to receive the distress signals from the transmitter 290. A solenoid relay 336 is mounted in the casing 332 adjacent to the radio receiver 334 and has the solenoid coil 338 thereof connected in a circuit in the radio receiver so the solenoid will be energized when a distress signal is received by the radio receiver to close the relay contacts. The solenoid relay 336 will have two pairs of contacts which will be simultaneously closed by the relay switch arms when solenoid 338 is energized.

One pair of contacts will close the circuit from a source of power supply 340 to the wire 342 connected to a conventional radio transmitter 344 to form a police transmitter for transmitting a radio signal to notify police through receivers at police radio stations of the accident and its location. The other pair of contacts of the solenoid relay 336 has a wire connection 346 from one contact to a conventional movie camera 348 and camera lights 350 for starting the operation of the movie camera to photograph the intersection in order to take a picture of the scene of the accident and the car or cars involved in the accident as soon as the camera is started by the transmission of the emergency radio signal from the transmitter 290. The lights 350 will light and the camera 348 will photograph the remainder of the accident from the time of the collision. At the same time the special police transmitter 344 will be operated to advise police of the accident.

When the movie camera has operated to take a predetermined length of film in the camera, a conventional form of switch in the camera will close a circuit to the solenoid latch 352 to move the latch to disengage the end of the arm operating the switch blade of the solenoid relay 336 for releasing the switch blade and allow the switch arms to disengage the relay contacts to open the circuits to the wires 342 and 346. When the relay is operated by energizing the solenoid 338 to close the circuit through the relay switch blades from the power supply 340 to the wires 342 and 346, the latch 352 will operate to retain the relay contacts in closed position until it is energized. This insures continuous operation of the camera automatically under its own self control until the switch operating mechanism in the camera closes the switch controlling the circuit to the solenoid latch 352 to operate the latch for releasing the relay from the closed position so the contacts can move to the open position and open the circuits to the wires 342 and 346. After the movie camera 348 has been operated to photograph the accident at the intersection where it is located, the camera 348 is serviced by opening the casing 332 and removing the film from the camera and replacing the photographed film with a new strip of film with the camera mechanism reset to photograph the next accident when the receiver 334 in the casing 332 is operated again by an emergency signal.

The movie camera 348 may have a supply film unit placed therein containing a length of film sufficient to take several photographs on predetermined lengths of film of successive accidents occurring at the intersection where the casing 332 is located. For this purpose the switch operated by the camera for controlling the solenoid latch 352 will be operated at the end of the predetermined length of film to operate the solenoid latch 352 and open the circuits controlled by the relay 336 so the camera is stopped after photographing a predetermined length of film of one accident. The camera can be serviced by removing the length of photographed film on a receiving spool also contained in a light tight casing and then connecting the end of the film on the supply spool after severing it from the photographed length of film to a new receiving spool which will then be arranged so that it will wind the film thereon for the next photograph of an accident. If desired, the camera may be serviced only after a given number of accidents to remove the complete length of film from the camera and replace it with a new supply. In this way, the camera 348 can be conveniently serviced from time to time to remove exposed film from the camera and replace it with unexposed film to take additional pictures from time to time.

The present invention provides the combination of a plurality of controls for operation in the control of electrical circuits of a motor vehicle in the event of a collision for opening the majority of the circuits to prevent short circuits and reduce the likelihood of fire resulting from a collision and at the same time provide means for giving both audible and visual signals to attract attention to the motor vehicle after the collision and at the same time provide for the transmission and reception of a radio distress signal to summon aid. The invention further provides a combination having a suitable unit located at a place where the accident may occur for receiving a distress signal from a motor vehicle transmitter for causing operation of a movie camera to photograph the accident where it may occur within the range of the movie camera and at the same time provide means for receiving and transmitting a distress call to summon aid to the location where the collision has occurred.

It is seen from the foregoing disclosure that the objects and purposes of the invention are well fulfilled. It is to be understood that the foregoing disclosure is given by way of illustrative example only, rather than by way of limitation, and that without departing from the invention, the details may be varied within the scope of the appended claims.

What is claimed is:

1. An emergency control switch for motor vehicle electrical systems having one circuit connection to the battery controlled thereby comprising a base plate of insulating material, a pair of spaced contact blocks mounted on one side of said base plate and having posts extending through said base plate for attachment of an electrical conductor from said battery to one of said blocks and electric connections to another of said blocks from the electrical system of said vehicle, a supporting bracket mounted on one terminal portion of said base plate, a movable plate of insulating material having one terminal portion hingedly connected to said supporting bracket in spaced relation to said base plate, for movement between a first position closer to said base plate and a second position farther from said base plate, a contact plate mounted for limited movement on said movable plate in opposed relation to said contact blocks, resilient means normally holding said contact plate at its limit of movement away from said movable plate, resilient means normally moving said movable plate on its hinge away from said base plate into its second position, a plurality of pairs of insulated contacts mounted on one of said plates on the side facing the other plate in spaced relation to each other, one pair of said contacts being normally engaged when said movable plate is in its second position for closing an electric circuit and the remaining pairs of said contacts being normally disengaged, a plurality of contact operating members adjustably mounted on the other of said plates each in opposed relation to one pair of said contacts for opening said normally engaged contacts and engaging said normally disengaged contacts when said movable plate is in its first position, and spring operated latch means for releasably holding said movable plate in its first position for resiliently holding said contact plate engaged with said pair of contact blocks and said contact operating members engaging and holding the respective pairs of contacts in operated positions.

2. In a motor vehicle wherein an electrical system has a battery, an ignition system for the motor of the motor vehicle, an electric starter for the motor, electrical circuit connections with said ignition system and electric starter connected to said battery, manually operated switch means for controlling said ignition system and electric starter, an electric lighting system for said motor vehicle having headlights, and a manually operable switch for said electric lighting system controlling said headlights, the combination of an emergency control switch movable between a first position and a second position and having a plurality of contacts controlling the electric circuits between said battery and said ignition system, electric starter and lighting system for closing said circuits when said emergency control switch is in said first position, means for normally tending to move said emergency control switch to said second position, a solenoid operated latch for latching said emergency control switch in said first position, a solenoid for moving said emergency control switch into said first position having electrical connections with said manually operated switch means and battery for operation under the control of said manually operated switch means, an electric audible alarm mounted on said motor vehicle having electrical connections with said battery and contacts operated by said emergency control switch to close the circuit thereto to sound said alarm when said emergency control switch is in said second position and said manually operable switch means is in position to close said ignition circuit, an electric circuit to said headlights having a pair of contacts on said emergency control switch, which contacts when closed serve to close the circuit to light said headlights when said emergency control switch is in said second position, an impact operated switch, and electric circuit means operatively connected to said battery and said impact operated switch and said solenoid operated latch for unlatching said latch when said impact operated switch is operated by an impact, so that said emergency control switch may move from said first position to said second position.

3. In a motor vehicle electrical system as claimed in claim 2, the combination of a radio transmitter mounted on said motor vehicle, an electromagnetic control switch for closing an electrical control circuit for operating said transmitter to transmit an emergency signal, and electric circuit connections for operating said electromagnetic control switch connected in the circuit with said impact operated switch for closing said electromagnetic control switch for operating said radio transmitter when said impact operated switch is operated to close its contacts.

4. The combination with a motor vehicle electrical system as claimed in claim 3, of an emergency signal operated unit mounted at a remote location to said motor vehicle comprising a motion picture camera, a radio receiver tuned to receive an emergency radio signal from said radio transmitter and means operated by said radio receiver upon receiving an emergency signal for starting operation of said motion picture camera.

5. The combination with a motor vehicle electrical system as claimed in claim 4, of a police radio transmitter in said emergency signal operated unit having means operated by said receiver upon receiving an emergency signal from said radio receiver for operating said police radio transmitter to send an emergency radio signal.

6. The combination as claimed in claim 3, having said electric circuit connections for operating said electromagnetic switch comprising a solenoid operated latch for normally holding said electromagnetic switch in open position and the solenoid of said latch connected in an electric circuit with the contacts of said impact operated switch and said battery for operating said latch to release said electromagnetic relay when said impact operated switch contacts are closed for closing the circuit to operate said radio transmitter, said electromagnetic relay having an electromagnet connected in circuit with said manually operated switch for being energized to open said electromagnetic switch when said manually operated switch is operated to stop operation of said radio transmitter.

7. The combination as claimed in claim 6, wherein said radio transmitter includes a manually operable control circuit for normal operation, an emergency circuit including a transmitter crystal for sending an emergency signal, an electric solenoid operated means for rendering said manually operable control circuit inoperative and rendering said emergency circuit operative when an emergency signal is to be sent.

8. In an electrical system for a motor vehicle including an electric battery with at least first and second terminals, an ignition system having one terminal grounded, an electric engine starter means having one terminal grounded, an ignition switch having a movable switch arm and a plurality of spaced contacts positioned for selective engagement by said switch arm, an electric circuit connection between said switch arm and said first terminal of said battery, and an electric connection closed from a first one of said contacts with the other terminal of said ignition system for starting the motor vehicle engine, the combination of an emergency control switch having a movable plate normally urged from a first position to a second position, a plate solenoid for operating said movable plate into its first position, said emergency control switch having battery control contacts for closing a circuit from said second battery terminal to ground in the first position of said movable plate for controlling the circuits to said ignition system and engine starter means independently of said ignition switch, relay locking means for normally locking said movable plate in its first position, a third contact on said ignition switch engaged by said switch arm when moved to open the circuit to said ignition system for closing a circuit to operate said relay locking means for releasing said movable plate for operation into its second position to open the circuit at said battery control contacts, and a fourth contact between said first and third contacts engaged by said switch arm in initial movement toward said first contact for closing a circuit to said plate solenoid for actuating said movable plate into its first position before said switch arm engages said first contact in closing the circuit to said ignition system for starting said motor vehicle engine.

9. In a system as claimed in claim 8, the combination of a pair of ignition control contacts connected in said ignition system for closing the circuit to said ignition system through said contacts when said movable plate is in the first position and opening the circuit to said ignition system when said movable plate is in the second position independently of said ignition switch.

10. In a system as claimed in claim 8, the combination of a plurality of lights as conventionally used on a motor vehicle including headlights, a wired electric circuit with said first and second battery terminals and the terminals of said lights including said headlights insulated from ground having manually operated switches controlling said lighting system and headlights, a plurality of contacts held in engaged circuit closing relation when said movable plate is in its first position selectively controlling selected portions of said wired electric circuit with one pair of contacts controlling the circuit to said headlights, said plurality of contacts controlling said electric circuit to said lights independently of said manually operated switches, a pair of signal contacts operated by said movable plate in its second position to engage and close a separate circuit with said first and second terminals of said battery, selected portions of said wired electric circuit including said headlights being included in said separate circuit together with said movable switch arm and first contact of said ignition switch, flasher means in said separate circuit for intermittently flashing said headlights when the circuit is closed, and impact operated switch means for closing a circuit to operate said relay locking means to release said movable plate from its first position for movement to its second position independently of said ignition switch whenever said motor vehicle is involved in a collision.

11. In a system as claimed in claim 8, the combination of a plurality of door operated switches connected in series in the circuit to said plate solenoid for controlling said circuit by requiring the motor vehicle doors to be closed for closing said door operated switches to close said circuit before said plate solenoid can be energized to move said movable plate into its first position.

12. In a system as claimed in claim 8, the combination of a seat belt switch for each seat belt connected in series in the circuit to said plate solenoid for requiring closing of said seat belt switches before the circuit to said plate solenoid may be closed for moving said movable plate into its first position.

13. In a system as claimed in claim 8, the combination of a pair of signal contacts operated by said movable plate in its second position to engage and close a circuit with said first and second terminals of said battery through the movable switch arm and selected contacts of said ignition switch, and signal means controlled by said circuit with said signal contacts for operation to give an emergency signal when said signal contacts are engaged to close said circuit.

14. In a system as claimed in claim 13, the combination of impact operated switch means for closing a circuit to operate said relay locking means to release said movable plate from its first position for movement to its second position independently of said ignition switch.

15. An emergency control for motor vehicle electrical systems having one circuit connection to the battery controlled thereby comprising a switch having a base plate of insulating material, a pair of spaced contact blocks mounted on one side of said base plate and having posts extending through said base plate for attachment of an electrical conductor from said battery to one of said blocks and electric connections to another of said blocks from the electrical system of said vehicle, a supporting bracket mounted on one terminal portion of said base plate, a movable plate of insulating material having one terminal portion hingedly connected to said supporting bracket in spaced relation to said base plate, for movement between first and second position, a contact plate mounted for limited movement of said movable plate in opposed relation to said contact blocks, resilient means normally holding said contact plate at its limit of movement away from said movable plate, resilient means normally moving said movable plate on its hinge away from said base plate into its second position, a plurality of pairs of insulated contacts mounted on one of said plates on the side facing the other plate in spaced relation to each other, one pair of said contacts being normally engaged when said movable plate is in its second position for closing an electric circuit and the remaining pairs of said contacts being normally disengaged, a plurality of contact operating members adjustably mounted on the other of said plates each in opposed relation to one pair of said contacts for opening said normally engaged contacts and engaging said normally disengaged contacts when said movable plate is in its first position, and spring operated latch means for releasably holding said movable plate in its first position for resiliently holding said contact plate engaged with said pair of contact blocks and said contact operating members engaging and holding the respective pairs of contacts in operated positions.

16. A switch as claimed in claim 15, wherein remote control means may be operated to move said movable plate into its first position and also operated to move said spring operated latch means so the movable plate will be moved to its second position by said second mentioned resilient means.

17. A switch as claimed in claim 15, wherein impact operated means will operate said spring operated latch means to release said movable plate for movement to its second position, and manually operated means will move said movable plate into its first position.

18. A safety electrical system for a motor vehicle of the type having a metal portion, a battery, an electric ignition circuit grounded on one side to said metal portion, an electric starter circuit grounded on one side to said metal portion, and an ignition switch movable between an "off" position and a motor starting position, characterized by the combination of:
 (a) an impact operated switch having contacts normally open and adapted to be closed by severe impact;
 (b) an emergency alarm including an alarm circuit;
 (c) control switch means movable between a first position and a second position;
 (d) said control switch means being effective in its first position to
  (1) establish a grounding circuit for grounding one side of said battery to said metal portion, and
  (2) close said ignition circuit at a first point thereof, and
  (3) open said alarm circuit at a first point thereof;
 (e) said control switch means being effective in its second position to
  (1) open said ignition circuit at said first point thereof, and
  (2) close said alarm circuit at said first point thereof, and
  (3) render said grounding circuit inoperative;
 (f) means controlled by closing said contacts of said impact operated switch for moving said control switch means from its first position to its second position;
 (g) means controlled by movement of said ignition switch toward said motor starting position for moving said control switch means to its first position and concomitantly closing said starter circuit at one point thereof remote from said grounded side thereof and concomitantly closing said ignition circuit at a second point thereof and concomitantly closing said alarm circuit at a second point thereof;
 (h) means controlled by movement of said ignition switch to its "off" position for opening said ignition circuit at said second point thereof and concomitantly moving said control switch means to its second position and concomitantly opening said alarm circuit at said second point thereof, thereby rendering said alarm circuit ineffective notwithstanding that it is closed at said first point thereof by movement of said control switch means to its second position, and thereby opening said ignition circuit also at said first point thereof as well as said second point thereof and also rendering said battery grounding circuit inoperative.

19. A motor vehicle emergency alarm and safety mechanism comprising a manually operable ignition switch movable to any one of a plurality of positions including an "off" position and an "on" position, a control member movable from a first position to a second position, an impact switch movable by external impact from an open position to a closed position, means rendered effective by closing said impact switch for moving said control member to said second position, an alarm circuit including a first switch and a second switch in series with each other, means operated by said control member for opening said first switch when said control member is in its first position and closing said first switch when said control member is in its second position, and means operated by movement of said ignition switch for closing said second switch of said alarm circuit when said ignition switch is in "on" position and opening said second switch when said ignition switch is in "off" position, so that said alarm circuit will be activated by movement of said control member to its second position while said ignition switch is "on" but will not be activated by such movement of said control member while said ignition switch is "off."

References Cited by the Examiner

UNITED STATES PATENTS

| | | |
|---|---|---|
| 1,901,554 | 3/1933 | Wilde. |
| 2,155,758 | 4/1939 | Hinde. |
| 2,337,838 | 12/1943 | Reavis. |
| 2,972,134 | 2/1961 | McKay. |
| 3,123,801 | 3/1964 | Bosler _____ 340—52 |

NEIL C. READ, *Primary Examiner.*

A. H. WARING, *Assistant Examiner.*